US009992257B2

(12) United States Patent
Li

(10) Patent No.: US 9,992,257 B2
(45) Date of Patent: Jun. 5, 2018

(54) SYSTEM AND METHOD FOR DYNAMIC IN-SESSION ALTERING OF REMOTE DESKTOP WINDOWS

(71) Applicant: Chendong Li, San Jose, CA (US)

(72) Inventor: Chendong Li, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 795 days.

(21) Appl. No.: 14/478,376

(22) Filed: Sep. 5, 2014

(65) Prior Publication Data

US 2016/0072872 A1    Mar. 10, 2016

(51) Int. Cl.
*H04L 29/08*    (2006.01)

(52) U.S. Cl.
CPC ............ *H04L 67/025* (2013.01); *H04L 67/08* (2013.01); *H04L 67/141* (2013.01)

(58) Field of Classification Search
CPC ..... H04L 67/025; H04L 67/08; G06F 3/1454; G06F 9/4445
See application file for complete search history.

(56) References Cited

U.S. PATENT DOCUMENTS

| | | | | |
|---|---|---|---|---|
| 2006/0230156 | A1* | 10/2006 | Shappir | G06F 3/1454 709/227 |
| 2010/0299436 | A1* | 11/2010 | Khalid | G06F 1/1643 709/226 |
| 2012/0284632 | A1* | 11/2012 | Baird | G06F 9/4445 715/749 |

OTHER PUBLICATIONS

Microsoft Corporation, [MS-RDPBCGR]: Remote Desktop Protocol: Basic Connectivity and Graphic Remoting, 456 pages, May 15, 2014.
Microsoft Corporation, [MS-RDPCR2]: Remote Desktop Protocol: Composited Remoting V2, 240 pages, May 15, 2014.
Microsoft Corporation, [MS-RDPEDC]: Remote Desktop Protocol: Desktop Composition Virtual Channel Extension, 37 pages, May 15, 2014.
Microsoft Corporation, [MS-RDPEDISP]: Remote Desktop Protocol: Display Update Virtual Channel Extension, 19 pages, May 15, 2014.
Microsoft Corporation, [MS-RDPEGDI]: Remote Desktop Protocol: Graphics Device Interface (GDI) Acceleration Extensions, 284 pages, May 15, 2014.
Microsoft Corporation, [MS-RDPEGFX]: Remote Desktop Protocol: Graphics Pipeline Extension, 119 pages, May 15, 2014.
Microsoft Corporation, [MS-RDPNSC]: Remote Desktop Protocol: NSCodec Extension, 32 pages, May 15, 2014.
Microsoft Corporation, [MS-RDPRFX]: Remote Desktop Protocol: RemoteFX Codec Extension, 142 pages, May 15, 2014.

(Continued)

*Primary Examiner* — Sara England
(74) *Attorney, Agent, or Firm* — Baker Botts L.L.P.

(57) ABSTRACT

Examples of systems and methods are provided for the dynamic in-session altering of a remote desktop window. A client device may establish a remote session with a server to provide to a user a remote desktop window. The client device detects events associated with the remote desktop window. Information related to the detected even is sent to the server via a communications channel. The server sends to the client device updated remote desktop windows information and the client device alters the remote desktop size and resolution accordingly. The remote desktop is altered without requiring the disconnection of the current remote session and subsequent establishment of a new remote session.

18 Claims, 2 Drawing Sheets

(56) References Cited

OTHER PUBLICATIONS

Microsoft Corporation, [MS-RDPERP]: Remote Desktop Protocol: Remote Programs Virtual Channel Extension, 95 pages, May 15, 2014.
Microsoft Corporation, [MS-RDPEPS]: Remote Desktop Protocol: Session Selection Extension, 21 pages, May 15, 2014.
Microsoft Corporation, [MS-RDPEVOR]: Remote Desktop Protocol: Video Optimized Remoting Virtual Channel Extension, 30 pages, May 15, 2014.
Microsoft Corporation, [MS-RDPEV]: Remote Desktop Protocol: Video Redirection Virtual Channel Extension, 85 pages, May 15, 2014.

\* cited by examiner

SYSTEM AND METHOD FOR DYNAMIC IN-SESSION ALTERING OF REMOTE DESKTOP WINDOWS

TECHNICAL FIELD

The present disclosure relates generally to the operation of computer systems and information handling systems, and, more particularly, remote desktop connections that support dynamic altering of remote desktop windows.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Information handling systems may comprise server systems and client systems. As information handling systems have become more robust, users have requested expanded access to such systems. For example, servers may be located in a remote location or a user may be at an off-site location. In these instances, a user may use a remote desktop connection to access the data on a given server, client, or other information handling system. Such a connection allows a user to display in a window, for example, the contents of that user's desktop from any compatible information handling system at any location.

However, such remote desktop connections do not support the dynamic alteration, for example, resizing, of windows. For example, when connecting to a remote session, for example, via the remote desktop protocol (RDP), to a remote server in the full screen mode, the remote session is unable to adjust the size of the initial remote desktop window. The user is not permitted to drag the boundary of the remote desktop window to resize the remote desktop window. The remote desktop window cannot be resized to be either larger or smaller. Instead, a vertical and horizontal side bar on the boundary of the remote desktop window is displayed. These bars on the boundary of the remote desktop window permit the user to scroll the contents of the remote desktop window either up and down or side to side.

SUMMARY

In accordance with the present disclosure, systems and methods for dynamic altering of in-session remote desktop windows are described.

In one aspect, to provide the user with a seamless in-session dynamic alteration of a remote desktop window, a client may dynamically detect a current position of the user's mouse to determine a height and width of a remote desktop window for a new remote session. This new height and width may be sent to the server through a communications channel such as a display control virtual channel.

In one aspect, the client device initiates a remote connection via an interface to an information handling system (IHS). A remote connection is established between the client device and the IHS. A communications channel is opened between the client device and the IHS. The client device displays a remote desktop window based, at least in part, on information received from the IHS. The client device dynamically detects an event, wherein the event is based, at least in part on changes to the remote desktop window. The client device sends a request via the communications channel to the IHS for information to update the remote desktop window given the detected event. The client device alters the display of the remote desktop window based, at least in part, on the received information from the IHS. The altering of the display of the remote desktop window occurs without disconnection the remote session and establishing a new remote session.

In another aspect, the session is an RDP session which may be established using a remote desktop protocol (RDP). The communications channel opened may be a virtual channel such as a display control dynamic virtual channel.

In another aspect, the detected event may be a mouse event. The mouse event may be triggered by a user dragging the edges of the remote desktop window so as to resize the remote desktop window. The mouse event may also be associated with a change in resolution of the remote desktop window. A change in resolution may also create an event other than a mouse event.

In one aspect, the IHS may send information to the client device via a protocol data unit (PDU). The information may also be encapsulated to reduce errors during transmission.

The system and method disclosed herein is technically advantageous because it allows for the dynamic resizing of a window for displaying a remote desktop after a remote session has been initiated. The user can resize the remote desktop window (the window for displaying the desktop associated with the remote session) by dragging any edge of the remote session window. Further, the remote session resolution of the remote desktop window can be adjusted automatically. A user is provided a seamless in-session dynamic resizing of a remote desktop window without any disconnection and reconnection requirements or wait times associated with connection issues. Such a system and method would be understood by a person of ordinary skill in the art to be easily portable to any number of platforms.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
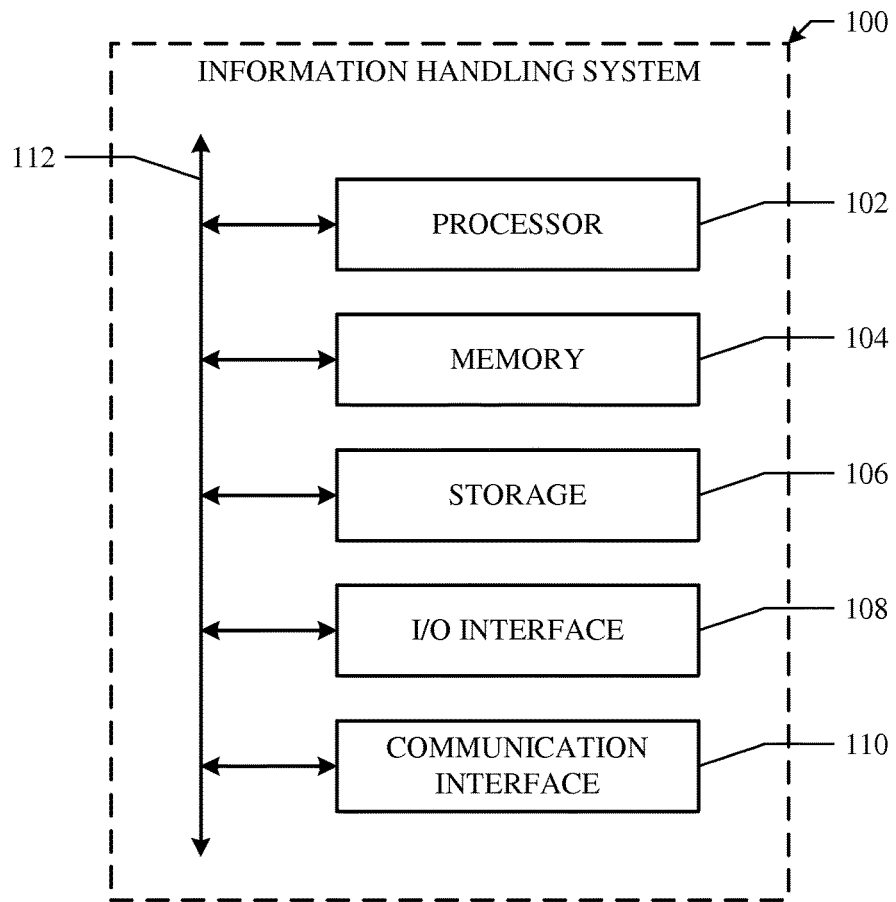
FIG. 1 shows an example information handling system according to aspects of the present disclosure.

FIG. 1 illustrates an exemplary information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100 including, but not limited to, servers and clients. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106;

or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Communication interface 110 may allow for connection to a remote session using any known protocol, for example, the remote desktop protocol (RDP). Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
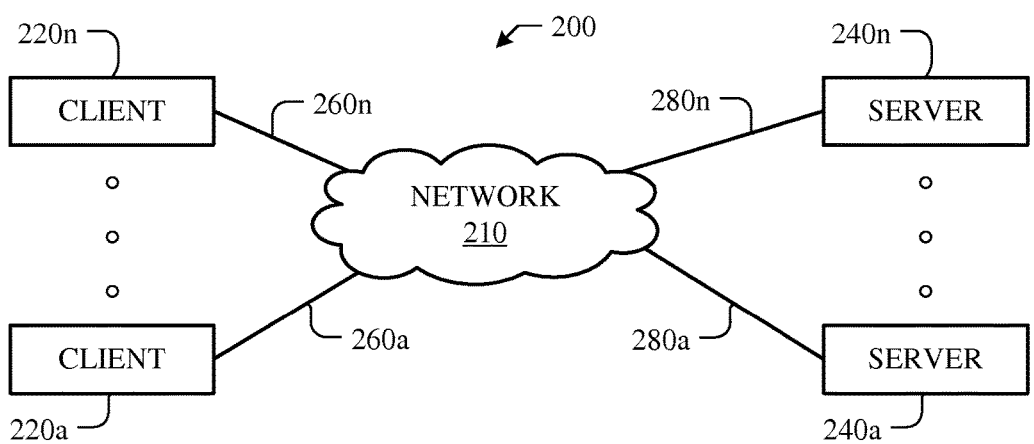
FIG. 2 shows an example information handling system network.

FIG. 2 illustrates an example network environment 200 in which an information handling system may operate with other local or remote devices in accordance with an aspect of the present disclosure. The system 200 may include one or more remote client devices 220a-n (referred to generally as 220) in communication with a server computing device 240a-n (server) (referred to generally as 240) via a network 210. In one aspect, the server 240 is configured to allow remote sessions (e.g., remote desktop sessions) wherein users can access applications and files on the server 240 by logging onto the server 240 from a client device 220. Interfaces 260a-n allow for communication to/from client devices 220a-n to/from network 210. Likewise, interfaces 280a-n allow for communication to/from servers 240a-n to/from network 210. A communication connection between a sever 240a and a client 220a may be initiated by client 220a using interface 260a to connect through network 210 through interface 280a to server 240a.

By way of illustration and not limitation, in one aspect of the disclosure, client device 220 is an RDP client and connects via interface 260 to the network 210 using any of several well-known techniques such as the remote desktop protocol (RDP). Server 240 is an RDP server and connects via interface 280 to the network 210 using any of several well-known techniques such as the remote desktop protocol (RDP).

By way of illustration and not limitation, in one aspect of the disclosure, stated from a perspective of a server side (treating a server as a local device and treating a client device as a remote device), a server application is executed (or runs) at a server 240. While a remote client device 220 may receive and display a view of the server application on a display local to the remote client device 220, the remote client device 220 does not execute (or run) the server application at the remote client device 220. Stated in another way, from a perspective of the client side (treating a server as remote device and treating a client device as a local device), a remote application is executed (or runs) at a remote server 240.

By way of illustration and not limitation, a client device 220 may represent any information handling system capable of supporting a remote desktop application and the display of a remote desktop in a window on the information handling system as well as a connection to a remote server. One of ordinary skill in the art would understand that such a device could include a computer, a mobile telecommunications device such as a smartphone, a laptop computer, a thin client device, a personal digital assistant (PDA), a portable computing device, or a suitable device with a processor. In one example, a client device 220 can be mobile. In another example, a client device 220 can be stationary. According to one aspect of the disclosure, a client device 220 may be a device having at least a processor and memory, where the total amount of memory of the client device 220 could be less than the total amount of memory in a server 240. In one example, a client device 220 does not have a hard disk. In one aspect, a client device 220 has a display smaller than a display supported by a server 240 capable of displaying a remote desktop window. In one aspect, a client device may include one or more client devices.

In one aspect, a server 240 may represent any information handling system capable of supporting remote desktop communications. Server 240 may include a computer, a laptop computer, a computing device, a virtual machine (e.g., VMware® Virtual Machine), a desktop session (e.g., Microsoft Terminal Server), a remote desktop server (RDS) farm, a published application (e.g., Microsoft RemoteApp Application in a Microsoft Terminal Server) or a suitable device with a processor. In one aspect, a server 240 can be stationary. In another aspect, a server 240 can be mobile. In certain configurations, a server 240 may be any device that can represent a client device. In one aspect, a server 240 may include one or more servers.

In one example, a first client device 220a is remote to either a second client device 220n when the first client device 220a is not directly connected to the second client device 220n. In one example, a first remote device, for example, server 240a may be connected to a second client device 220n over a communication network such as a Local Area Network (LAN), a Wide Area Network (WAN), and/or other network 210.

When a client device 220 and a server 240 are remote with respect to each other, a client device 220 may connect to a server 240 over a network 210, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 210 can be a LAN network, a WAN network, a wireless network, the Internet, an intranet or other network. A network 210 may include one or more routers for routing data between client devices and/or servers. A remote device (e.g., client device, server) on a network may be addressed by a corresponding network address, such as, but not limited to, an Internet protocol (IP) address, an Internet name, a Windows Internet Name Service (WINS) name, a domain name or other system name. These illustrate some examples as to how one device may be remote to another device. But the subject technology is not limited to these examples.

According to certain aspects of the present disclosure, the terms "server" and "remote server" are generally used synonymously in relation to a client device, and the word "remote" may indicate that a server is in communication with other device(s), for example, over a network connection(s).

According to certain aspects of the present disclosure, the terms "client device" and "remote client device" are generally used synonymously in relation to a server, and the word "remote" may indicate that a client device is in communication with a server(s), for example, over a network connection(s). In one aspect of the disclosure, a "client device" may be sometimes referred to as a client or vice versa. Similarly, a "server" may be sometimes referred to as a server device or vice versa.

In one aspect, the terms "local" and "remote" are relative terms, and a client device may be referred to as a local client device or a remote client device, depending on whether a client device is described from a client side or from a server side, respectively. Similarly, a server may be referred to as a local server or a remote server, depending on whether a server is described from a server side or from a client side, respectively. Furthermore, an application running on a server may be referred to as a local application, if described from a server side, and may be referred to as a remote application, if described from a client side.

In one aspect, devices placed on a client side (e.g., devices connected directly to a client device(s) or to one another using wires or wirelessly) may be referred to as local devices with respect to a client device and remote devices with respect to a server. Similarly, devices placed on a server side (e.g., devices connected directly to a server(s) or to one another using wires or wirelessly) may be referred to as local devices with respect to a server and remote devices with respect to a client device.

In one aspect, a user, from client 220, accesses applications residing on server 240 through a remote session, for example, an RDP session, using a known protocol, for example, RDP. Once the session is established, the user will have access to the server applications from the remote client 220 with a full desktop experience.

Figure 3:
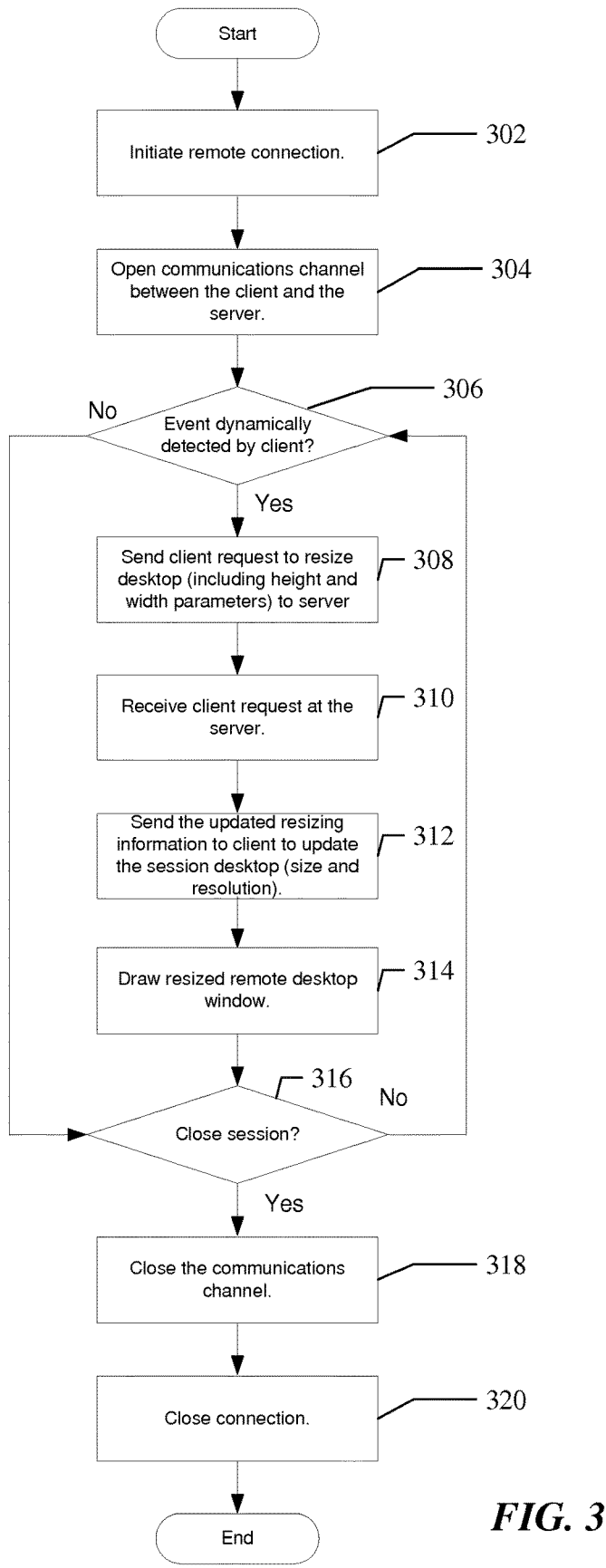
FIG. 3 is a flowchart depicting an example method for dynamically altering an in-session remote desktop window.

FIG. 3 illustrates an example method 300 for dynamically altering a remote desktop window. The method may begin at step 302, where a remote connection is initiated. The remote connection may be, for example, an RDP connection. The RDP connection may be initiated by a client 220a via an interface 260a using a protocol for establishing such connections, such as, an RDP protocol. The client 220a may communicate to a local or remote device for establishing a remote session such as client 220n or server 240a.

Once the remote connection is initiated and a remote session is established, for example, an RDP session is established, at step 304 the client opens the communications channel between the client and the server. As stated above, the server may be any information handling system located in proximity to or at a distance from the client device. In one aspect, a virtual channel is opened to provide a bi-directional connection stream through the RDP protocol. For example, a display control dynamic virtual channel may be opened. The virtual channel allows for additional functionality by allowing third parties to establish a communications channel between the client and the server. A remote desktop window is displayed on the client, for example, client 220a with the configuration and data provided by a server, for example, server 240a. Client 220a may also establish a connection with any other device such as client 220n or server 240n. The remote desktop window may display to the user a virtual desktop with the same functionality and features as the user would experience from being logged in directly to server 240a.

At step 306, the client 220a dynamically detects an event, such as a mouse event, associated with the remote desktop window. The event may be any change to the remote desktop window including, but not limited to, resizing or changing the resolution of the remote desktop window. The user may resize the remote desktop window by dragging any corner or side of the remote desktop window. The user may increase or decrease the size of the remote desktop window. The user may also change the resolution of the remote desktop window. Changing the resolution may also trigger an event wherein similar steps as those described for a mouse event are implemented. The user may also decide at this step or any step throughout the remote session to close the session as determined at step 316.

At step 308, if an event is detected, the client 220a sends a request to the server 240a to resize the remote desktop window. The client 220a may send height and width parameters to the server 240a with the resize request. The client 220a sends the request without disconnecting and then reconnecting to the server 240a. That is, client 220a may send the request over the communications channel which does not require that the current session be closed and a new session opened before any altering of the remote desktop window can occur. For example, the request may be sent over the display control dynamic virtual channel.

At step 310, the server 240a receives the request from client 220a to update the session and responds with the requested update information. The requested update information may be encapsulated to provide for uncorrupted communication between the server 240a and the client 220a. For example, control information may be added to the requested update information at each layer of the protocol, for example, the RDP protocol. This data at each layer is generically referred to as protocol data unit (PDU). The server 240a, at step 312, sends the updated information, for example, encapsulated in a PDU, to the client 220a to provide for uncorrupted transmission of the remote desktop information. If the user has requested that the remote desktop window be resized, this remote desktop information will comprise necessary parameters for updating and resizing the remote desktop window. Likewise, if the user has requested that the resolution of the remote desktop window be changed or altered, the remote desktop information will comprise the necessary parameters for updating and resizing the remote desktop window.

The client 220a receives the updated resizing information, the PDU. This information may include dimensions or sizing information and resolution information. The remote desktop window is then redrawn and displayed at step 314. The remote desktop window may be altered as to the specified request without the use of directional controls to move the contents of the remote desktop window into view by a user. That, is the user is permitted to resize the remote desktop window seamlessly without any scrollable side bars as the remote desktop window is resized dynamically to meet the size and proportions as designated by the user. The remote desktop window may be redrawn without any noticeable delay by the user. The user may request that the remote desktop window be redrawn multiple times. The request by client 220a and subsequent redrawing of the remote desktop window is performed without any process requiring disconnection and reconnection.

The user may request that the session be closed at step 316 or another event may occur. If the user requests that the session be closed, the communications channel, such as the virtual channel, is closed at step 318 and the connection for the session is closed at step 320. The user may request that the session be closed at any time throughout the remote session and not only at step 316. If the user does not close the remote session, the method continues to dynamically detect events at step 306 that trigger requests to resize the remote desktop window.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A client device for dynamically altering a remote desktop window, comprising:
    a memory;
    a processor communicatively coupled to the memory; and
    instructions encoded in the memory, the instructions, when executed by the processor, operable to perform operations comprising:
        initiating a remote connection via an interface to an information handling system (IHS);
        establishing a remote session via the remote connection;
        opening a communications channel with the IHS;
        displaying a remote desktop window;
        dynamically detecting an event, wherein the event is based, at least in part, on changes to the remote desktop window;
        sending a request to the IHS via the communications channel, wherein the request is based, at least in part, on the detected event, wherein the request is encapsulated;
        receiving encapsulated information from the IHS based, at least in part, on the request, wherein control information is added to the encapsulated information at each layer of a protocol as a protocol data unit; and
        altering the display of the remote desktop window based, at least in part, on the received encapsulated information, wherein the altering the remote desktop window occurs without disconnecting the remote session and establishing a new remote session as the request is sent via the communications channel which does not require closing the remote session and opening the new remote session before the remote desktop window can be altered.

2. The client device of claim 1, wherein the remote session is an RDP session.

3. The client device of claim 1, wherein the remote session is established using an RDP protocol.

4. The client device of claim 1, wherein the communications channel is a virtual channel.

5. The client device of claim 1, wherein the communications channel is a display control dynamic virtual channel.

6. The client device of claim 1, wherein the detected event is a mouse event.

7. The client device of claim 1, wherein the detected event is indicative of a change in resolution of the remote desktop window.

8. The client device of claim 1, wherein the information received from the IHS is encapsulated.

9. A method for dynamically altering a remote desktop window, comprising:
    initiating by a client device a remote connection via an interface to an information handling system (IHS);
    establishing a remote session via the remote connection;
    opening a communications channel with the IHS;
    displaying a remote desktop window;
    dynamically detecting an event, wherein the event is based, at least in part, on changes to the remote desktop window;
    sending a request to the IHS via the communications channel, wherein the request is based, at least in part, on the detected event, wherein the request is encapsulated;
    receiving encapsulated information from the IHS based, at least in part, on the request, wherein control information is added to the encapsulated information at each layer of a protocol as a protocol data unit; and
    altering the display of the remote desktop window based, at least in part, on the received information, wherein the altering the remote desktop window occurs without disconnecting the remote session and establishing a new remote session as the request is sent via the communications channel which does not require closing the remote session and opening the new remote session before the remote desktop window can be altered.

10. The method of claim 9, wherein the remote session is an RDP session.

11. The method of claim 9, wherein the remote session is established using an RDP protocol.

12. The method of claim 9, wherein the communications channel is a virtual channel.

13. The method of claim 9, wherein the communications channel is a display control dynamic virtual channel.

14. The method of claim 9, wherein the detected event is a mouse event.

15. The method of claim 9, wherein the detected event is indicative of a change in resolution of the remote desktop window.

16. The method of claim 9, wherein the information received from the IHS is encapsulated.

17. A non-transitory machine-readable medium encoded with instructions for execution at a client device side for communication and for forwarding display data related to a remote session between a client device and a server device, the instructions comprising code for:

initiating a remote connection via an interface to a server device;
 establishing a remote session via the remote connection;
 opening a communications channel with the server device;
 displaying a remote desktop window;
 dynamically detecting an event, wherein the event is based, at least in part, on changes to the remote desktop window;
 sending a request to the server device via the communications channel, wherein the request is based, at least in part, on the detected event, wherein the request is encapsulated;
 receiving encapsulated information from the server device based, at least in part, on the request, wherein control information is added to the encapsulated information at each layer of a protocol as a protocol data unit; and
 altering the display of the remote desktop window based, at least in part, on the received information, wherein the altering the remote desktop window occurs without disconnecting the remote session and establishing a new remote session as the request is sent via the communications channel which does not require closing the remote session and opening the new remote session before the remote desktop window can be altered.

18. The non-transitory machine-readable medium of claim 17, wherein the remote session is established using an RDP protocol.

* * * * *